United States Patent [19]

Cox et al.

[11] Patent Number: 4,608,482
[45] Date of Patent: Aug. 26, 1986

[54] CONTROL FOR WELDING SYSTEM

[76] Inventors: Ron Cox, 2208 Victoria Street, Windsor, Ontario, Canada; Elzi Pettovello, 6326 Appoline Dr., Dearborn, Mich. 48126

[21] Appl. No.: 720,847

[22] Filed: Apr. 8, 1985

Related U.S. Application Data

[63] Continuation-in-part of Ser. No. 581,151, Feb. 17, 1984, Pat. No. 4,510,373.

[51] Int. Cl.[4] .............................................. B23K 9/10
[52] U.S. Cl. ............................. 219/132; 219/130.31; 219/137 PS; 219/137.71
[58] Field of Search .................. 219/132, 136, 137.71, 219/137 PS, 130.1, 130.31, 130.32, 130.33

[56] References Cited

U.S. PATENT DOCUMENTS

| | | |
|---|---|---|
| 3,581,051 | 5/1971 | Brown . |
| 3,968,341 | 7/1976 | Manning . |
| 4,051,344 | 9/1977 | Robbins . |
| 4,430,551 | 2/1984 | Toth . |
| 4,510,373 | 4/1985 | Cox et al. ........................... 219/132 |

FOREIGN PATENT DOCUMENTS 2840230  3/1979  Fed. Rep. of Germany .

OTHER PUBLICATIONS

A. F. Manz, "The 'One Knob Welder'," Sep. 1968, pp. 720–725, *Welding Journal.*

*Primary Examiner*—Clifford C. Shaw
*Attorney, Agent, or Firm*—Jones, Tullar & Cooper

[57] ABSTRACT

An improved welding power supply control circuit is disclosed. The control circuit, which incorporates a microprocessor, simultaneously adjusts the power supplied to a welding electrode and the speed of the electrode, in accordance with a selected power/speed relationship table or curve. The power/speed relationship of a selected table can be further modified manually, as by a potentiometer, to optimize the weld. Feedback circuitry senses the frequency of the weld and the weld voltage, to regulate the power and to modify the slope of the voltage/current output curve, respectively.

20 Claims, 13 Drawing Figures

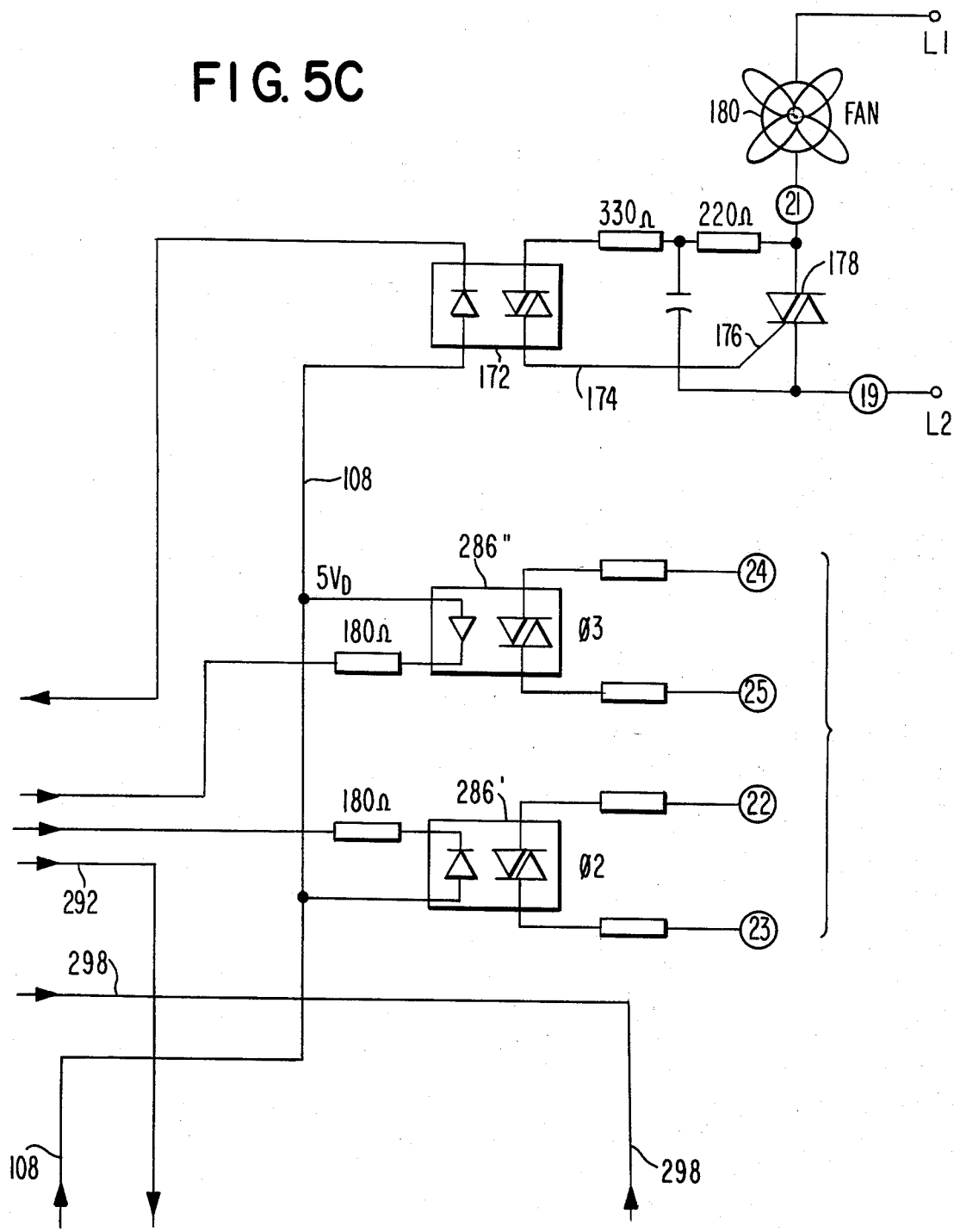

CONTROL FOR WELDING SYSTEM

This application is a continuation in part of copending Ser. No. 581,151 filed Feb. 17, 1984, which will issue as U.S. Pat. No. 4,510,373, on Apr. 9, 1985.

BACKGROUND OF THE INVENTION

This invention relates generally to arc welders and more particularly to a welding gun-mounted control means for use in adjusting welding criteria at the welding site.

In arc welding, it is known to utilize welding material in wire form as the consumable electrode. The wire, provided conveniently wound on a spool, is selectively unwound as required. In applicants' copending application filed Jan. 29, 1983, under Ser. No. 460,711, there is disclosed a wire feed mechanism of the type especially adapted to controllably advance consumable electrode wire to work station. The feed mechanism is driven by an electric motor, the rotational speed of which may be controlled so as to regulate the rate at which wire is unwound from the spooltand, hence, the rate at which the wire is feed to the work station.

It is also known to control the weld voltage by adjusting the voltage output of the welding power supply. Welding power variations are needed to accommodate different types of welding (i.e., spot or stitch), different types of material to be welded (i.e., steel or aluminum), and thickness variations in the parts to be welded.

It is common to use an arrangement whereby the consumable wire electrode is supplied to the work area through a welding gun via a flexible conduit. This permits the welding operation to be performed at a location remote from the welder power supply control unit. However, the operator must return to the conrol unit when it becomes necessary to adjust power settings and wire feed rate.

SUMMARY OF THE INVENTION

In the present invention, applicants provide a welding gun attached to the distal end of a flexible conduit, the welding gun being equipped with control means adapted to regulate both wire feed rate and weld voltage by a single adjustment. Thus, the operator may make necessary variations in weld voltage and wire feed rate in order to perform quality welding without returning to the control panel on the welder supply. In many operations, such as work performed on the underside of an automobile, this feature can result in considerable savings of time. The operator can also improve the quality of the welding, in that fine adjustment may be made as required, on the site. This is particularly true in the set-up of a welding operation when frequent adjustments are common.

Therefore, in accordance with the present invention, there is provided a welding control for use in an arc welding assembly of the type comprising a welding power unit, a drive means to selectively advance a consumable electrode to a weld site, a flexible conduit attached to the power unit for carrying the consumable electrode to the weld site, and a weld gun secured to the distal end of the conduit, the weld gun being provided with a control comprising a single adjustable means for regulating both the power output and the rate at which the electrode is supplied to the weld site.

More particularly, in accordance with one form of the invention, the weld gun is provided with a pair of directional switches which serve to generate, in a controller microprocessor, a ramp signal, as by means of an up/down counter, or a ramp generator, which selects predetermined arc voltages and corresponding electrode drive speeds for advancing the consumable electrode to the weld site. The controller microprocessor is located in the welder power supply control unit and functions in the control unit to provide precise and reliable control of the electrode speed and the welding voltage. Further, the microprocessor permits automatic adjustment of these parameters in response to the frequency of the voltage variations at the weld, permits control of the choke inductance, and thus of the current, at the arc, and permits control of numerous other functions in the welder power supply. Further, the controller includes control means for permitting easy manual selection of the desired overall relationship between electrode speed and welding voltage.

BRIEF DESCRIPTION OF DRAWINGS

The foregoing, and additional objects, features, and advantages of the present invention will become apparent from a consideration of the following detailed description of preferred embodiments thereof, taken in conjunction with the accompanying drawings, in which:

FIGS. 5A-5F provide a schematic diagram of a second embodiment of an electronic control circuit.

DESCRIPTION OF PREFERRED EMBODIMENTS

Figure 1:
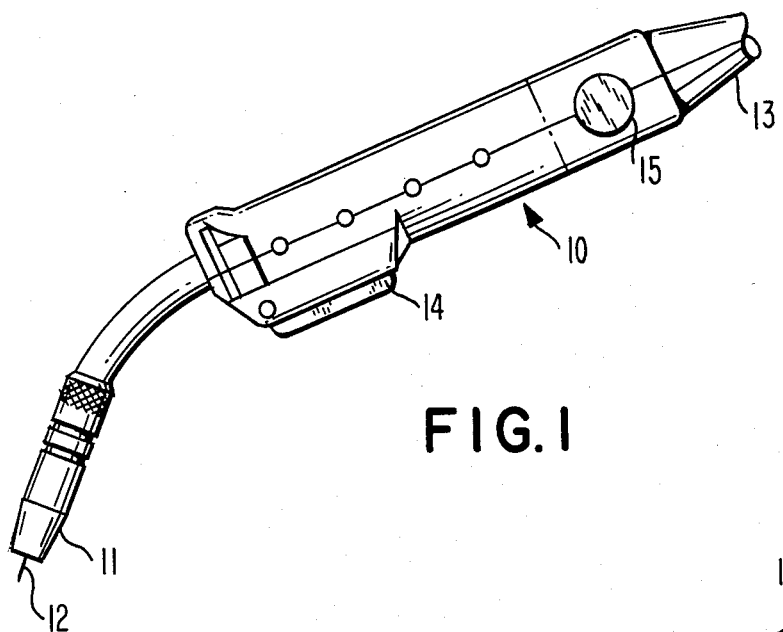
FIG. 1 is a side elevation view of a first embodiment of the welding gun of the present invention.

In accordance with one embodiment of the present invention, a gun assembly generally shown at 10 in FIG. 1 comprises a welding tip 11 through which a consumable electrode 12 may be fed. A flexible conduit 13 joining the weld gun to the welder control unit (not shown) supports the consumable electrode and control wires. It is to be understood that the flexible conduit 13 is of sufficient length to permit operation of the welding gun a suitable distance away from the welding control unit (such as underneath an automobile). An "on-off" switch 14 on the gun permits the operator to initiate or terminate the welding process. Also associated with the weld gun is an adjustable control which is shown in the form of a potentiometer in FIG. 2, and which is connected through the on-off switch to the welder control unit and hence to the power supply and electrode feed control circuit 31 of FIGS. 3A and 3B via lines 16 and 17 and corresponding teminals 16 and 17 in the circuit. It is to be understood that a multi-turn potentiometer may be used in order to provide greater adjustment if required. The assembly is designed so that a single adjustable means mounted on the gun effects control of the weld voltage as well as the rate at which the consumable electrode is advanced to the weld site. This relationship is described subsequently in connection with the circuit.

In operation, the spool-wound welding wire 12 such as steel, aluminum or brazing wire is suitably installed in a wire drive mechanism (not shown) and the end of the wire 12 is fed through the conduit 13 to the weld gun 10. The mode of operation, i.e., weld, spot or stitch, is selected and the type of material which will be welded, i.e., steel or aluminum, is set on a control panel at the welding control unit. The "on-off" switch 14 on the weld gun 10 is switched "on" and the control 15 is adjusted to commence the welding operation. The overall relationship of the weld power and the electrode speed is selected within the power unit so that these parameters are matched for optimum operation of the welder. Thereafter, a single adjustment of control 15 automatically regulates both variables at the same time as required to give optimum results for the type of welding being performed.

Figure 2:
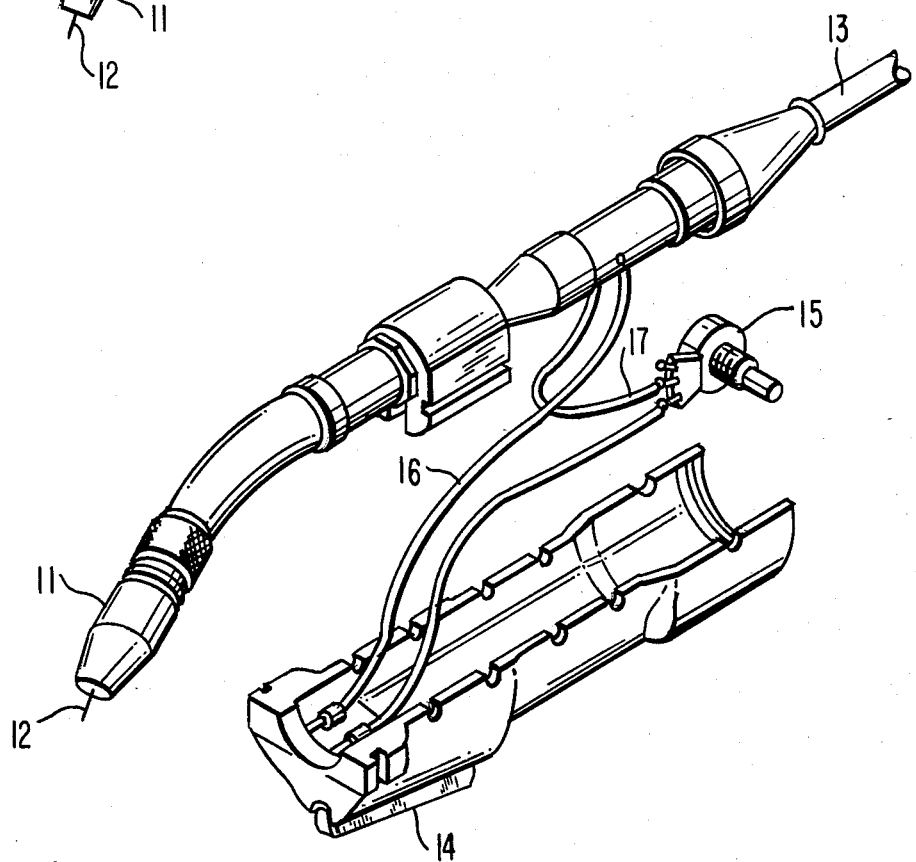
FIG. 2 is an exploded perspective view of the welding gun of FIG. 1.
Figure 3A:
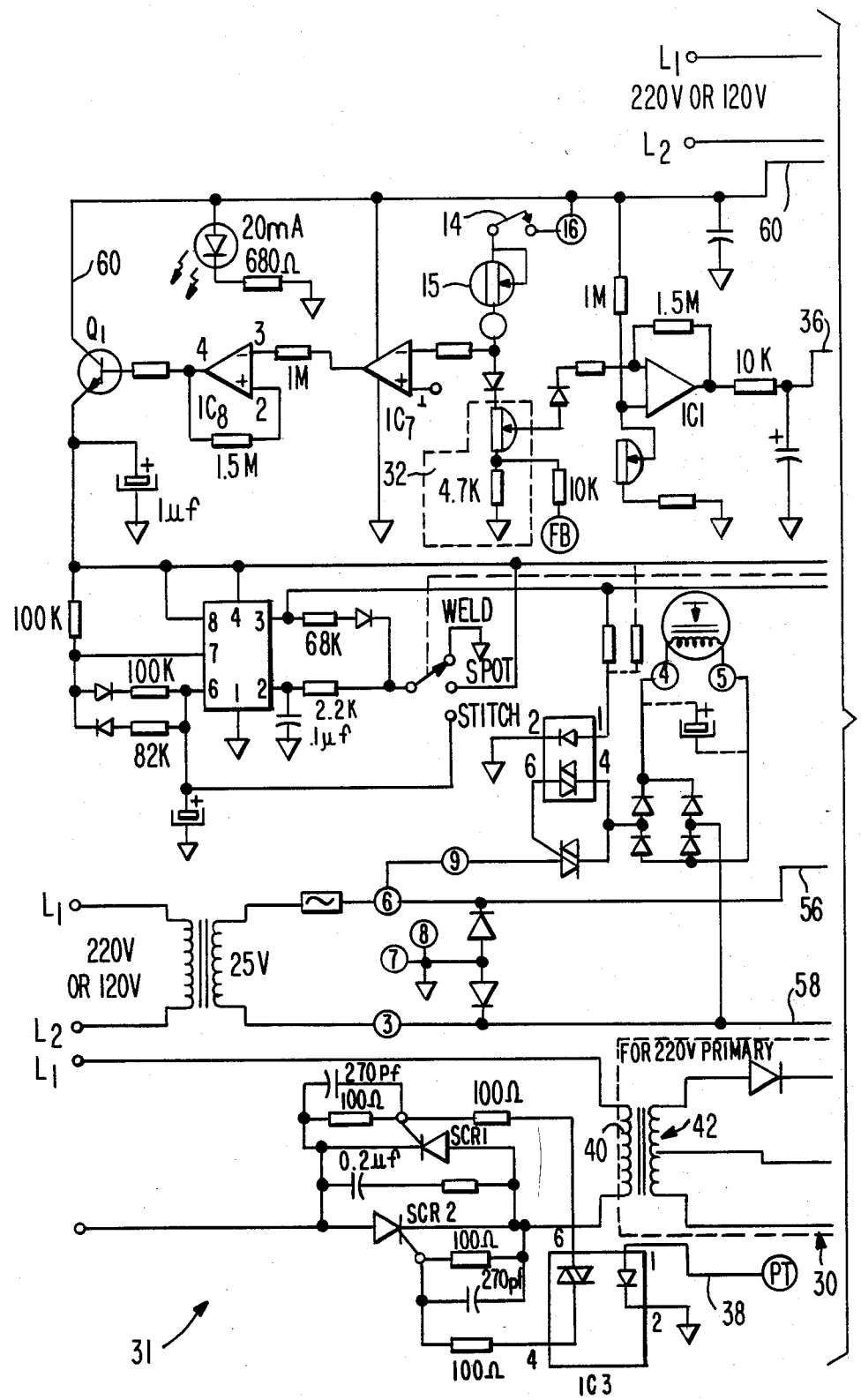
FIGS. 3A and 3B provide a schematic diagram of one embodiment of an electronic control circuit.

The "on-off" switch 14 may be wired in series with the adjustable control as shown in FIG. 2 and in FIG. 3A.

Figure 3B:
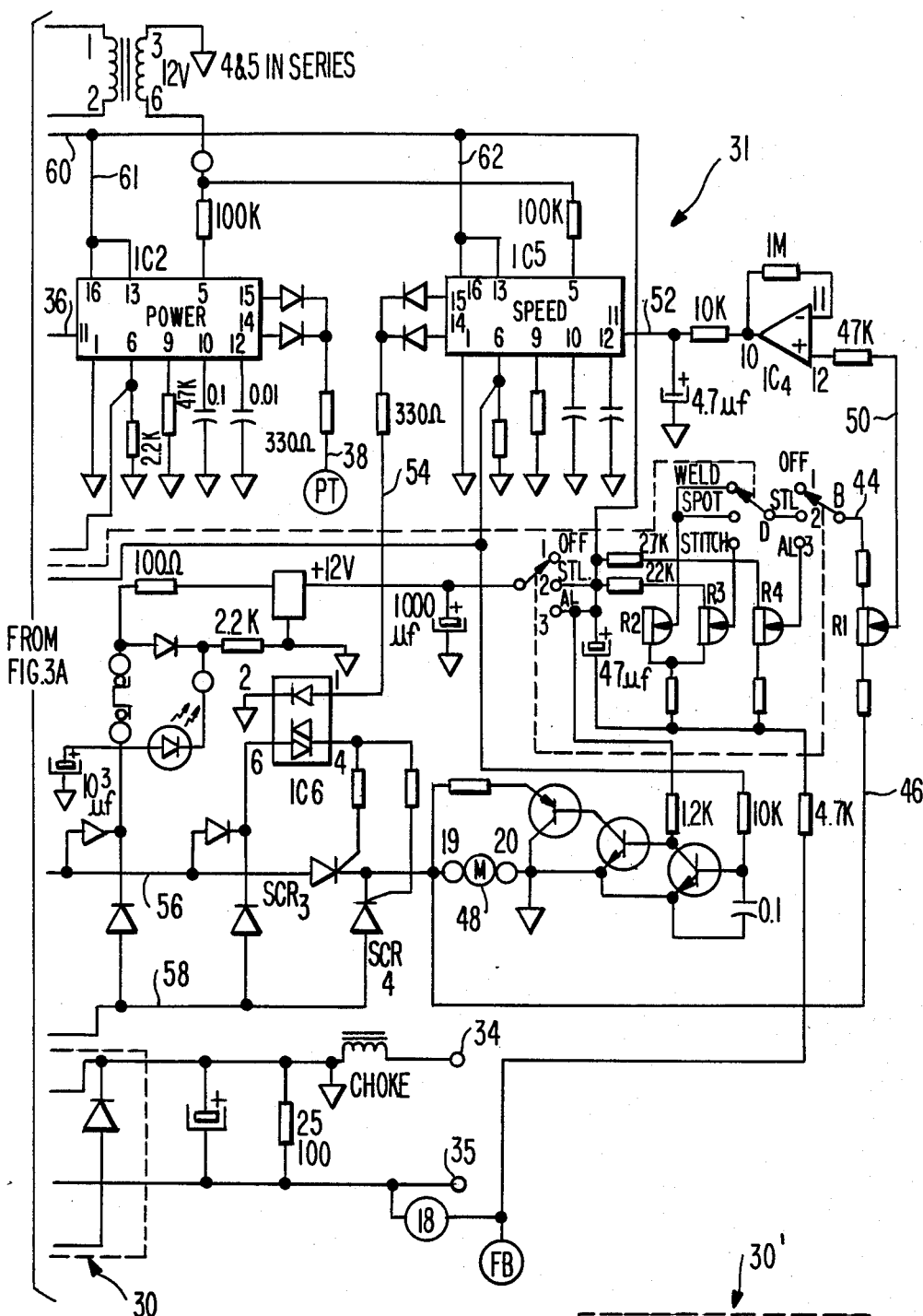

The construction and operation of the control circuit will now be described with reference to FIGS. 3A and 3B which illustrate a welding control circuit 31 contained in a welder power supply control unit. Operation is initiated by closing gun switch 14, which is illustrated schematically in FIG. 3A. The gun switch 14 and gun potentiometer 15 are connected to the control circuit 31 via terminals 16 and 17. Input from the gun potentiometer is summed in network 32 with a feedback voltage FB derived from the welding voltage present at the output terminals 34, 35 of the welding power supply control circuit 30 illustrated in FIG. 3B, at feedback terminal 18. The summed voltage is amplified by the operational amplifier IC1 and is applied to the power control element IC2 (such as a TCA 780D) by way of line 36. IC2 converts the analog signal from the operational amplifier to a train of pulses PT on line 38. The train of pulses is supplied to the optical isolator IC3 (MOC 3020) in FIG. 3A, thus firing $SCR_1$ and $SCR_2$ to control the voltage input to the primary 40 of the weld transformer 42, and hence to control the welding power at output terminals 34, 35.

Concomitantly, from the feedback terminal 18 a control voltage is supplied to line 44 through a selected one of potentiometers R2, R3 or R4 (FIG. 3B), depending on the set-up of selector switches D & B. As illustrated, switch D is used to selecte the mode; i.e., weld, spot or stich, and switch B is used to select the material to be welded; i.e., steel or aluminum. The control voltage on line 44 is summed in potentiometer R1 with a motor feedback voltage on line 46 from terminal 19 of electrode drive motor 48. The resultant voltage on line 50 is amplified through operational amplifier IC4 and is fed to speed control element IC5 via line 52. Speed control element IC5 converts the analog signal on line 52 into a series of pulses on line 54 which are fed through optical isolator IC6 to fire $SCR_3$ and $SCR_4$ which are connected in supply lines 56 and 58 and provide a drive voltage to terminal 19 of the motor 48. Thus, the input to the motor 48 is controlled and the rotational speed thereof regulated. The rotational speed of motor 48 directly controls the rate at which the electrode wire 12 is supplied to the weld site.

Closure of the gun switch 14 allows the voltage at terminal 17 also to be amplified by operational amplifiers IC7 and IC8, turning on transistor Q1. Conduction of Q1 enables the welding voltage circuit by way of collector output line 60 line 61, and power control element IC2, and enables the motor speed circuitry by way of lines 60 and 62 and speed control element IC5.

Figure 3C:
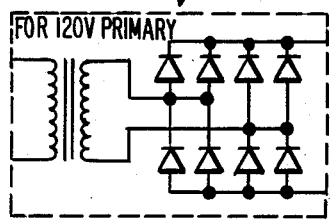
FIG. 3C shows an alternative form of power supply for the circuit of FIGS. 3A and 3B.
Figure 6:
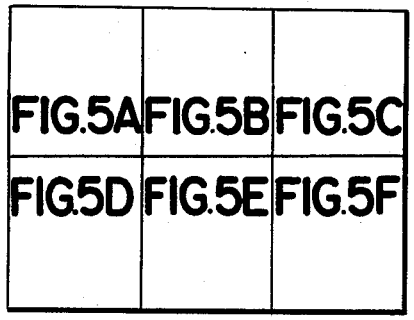
FIG. 6 illustrates the relationship of FIGS. 5A-5F.

As indicated in FIG. 3A, the power supply control circuit may be adapted to operate from 120 volt or 220 volt input. FIG. 3C illustrates an alternate rectifier circuit 30' for 120 primary voltage which replaces the rectifier circuit 30 of FIGS. 3A and 3B.

Figure 4:
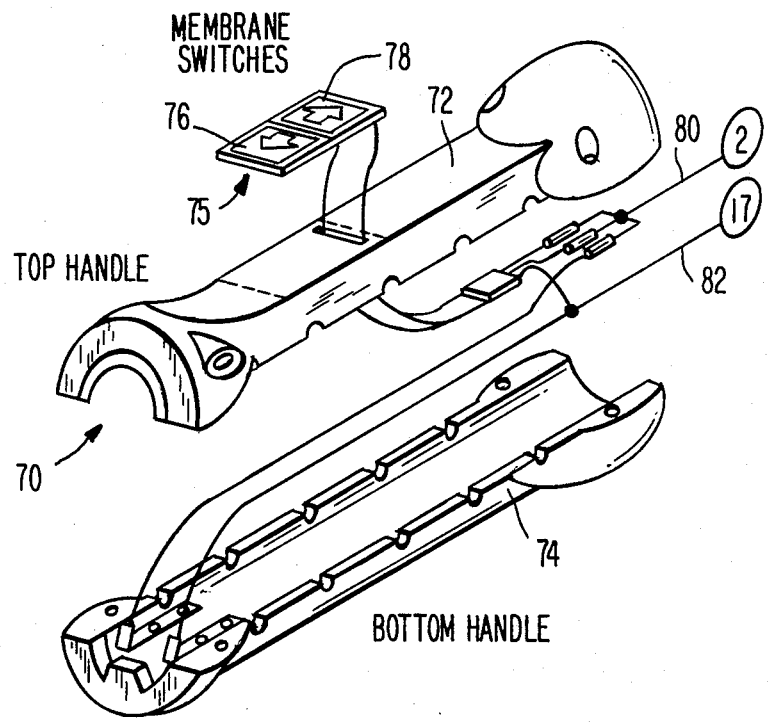
FIG. 4 is an exploded perspective view of a second embodiment of the welding gun of the present invention.

A second embodiment of the gun assembly of the invention is generally shown at 70 in FIG. 4, which illustrates in an exploded perspective view the top and bottom handle portions 72 and 74 which are assembled around the welding tip 11 and conduit 13 to form the welding gun. The on/off switch 14 is mounted on the bottom handle portion 74 in the manner described and illustrated with respect to the first embodiment. However, the adjustable control in this embodiment consists of an up/down control switch 75 which incorporates a pair of membrane switches 76 and 78 connected to the power supply control circuitry by way of lines 80 and 82 and terminals 2 and 17.

Although the up/down control switch 75 preferably is connected to the control circuitry by lines 80 and 82, it will be understood that the control signals from switch 75 can be transmitted in other ways, as by a radio transmitter, infrared signals, or the like, for convenient remote control of the power supply.

Figure 5A:
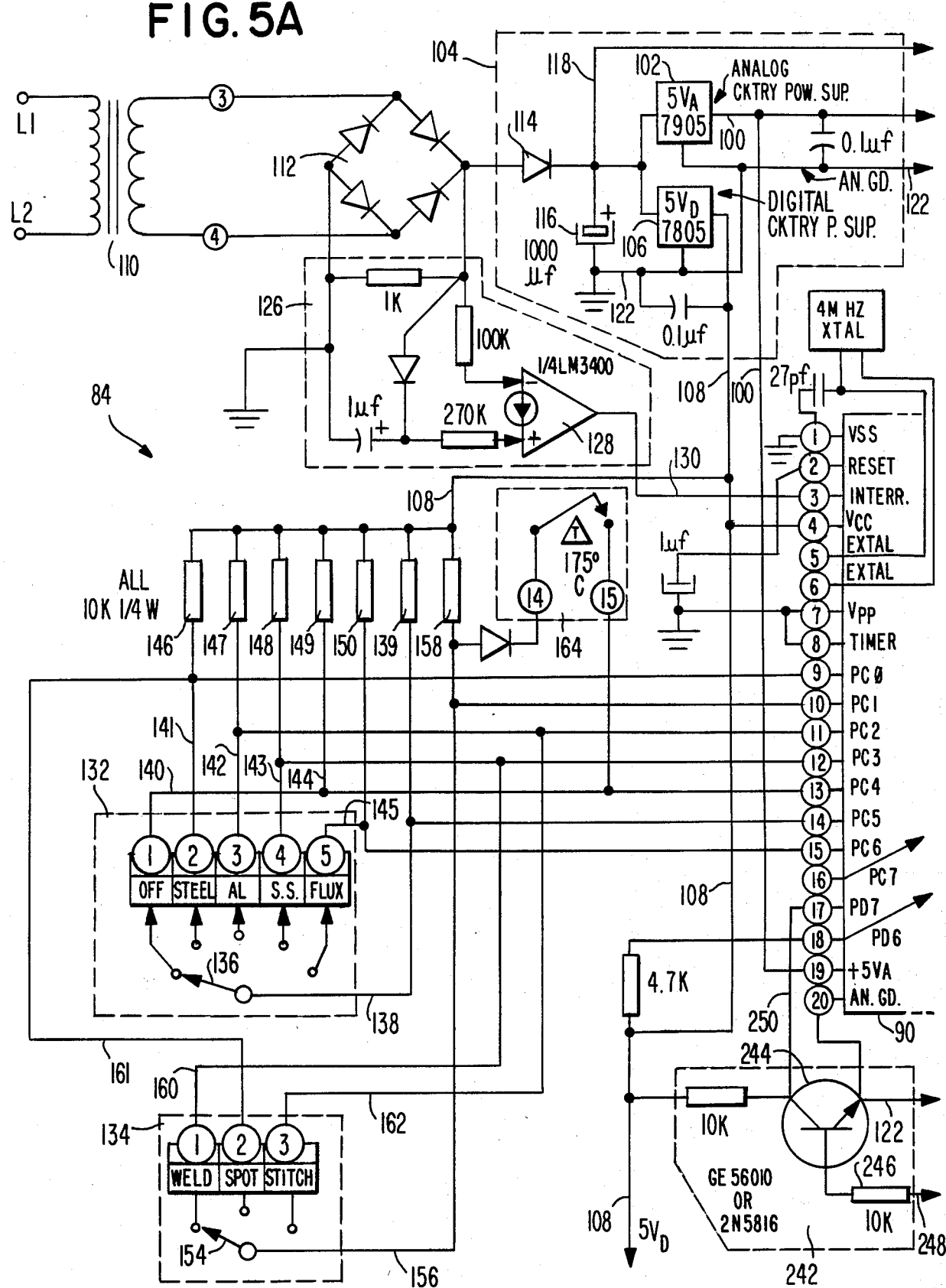
Figure 5B:
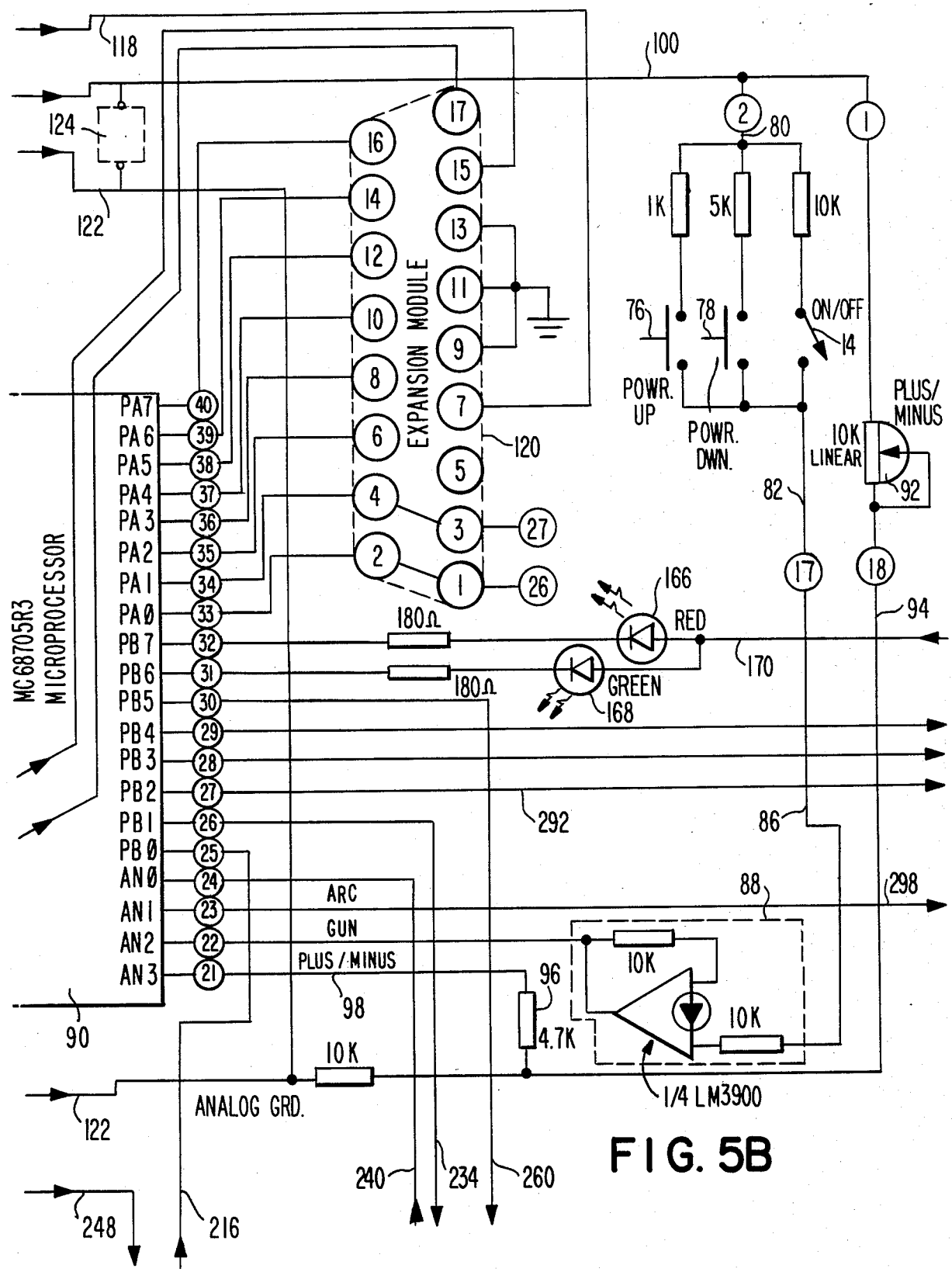
Figure 5D:
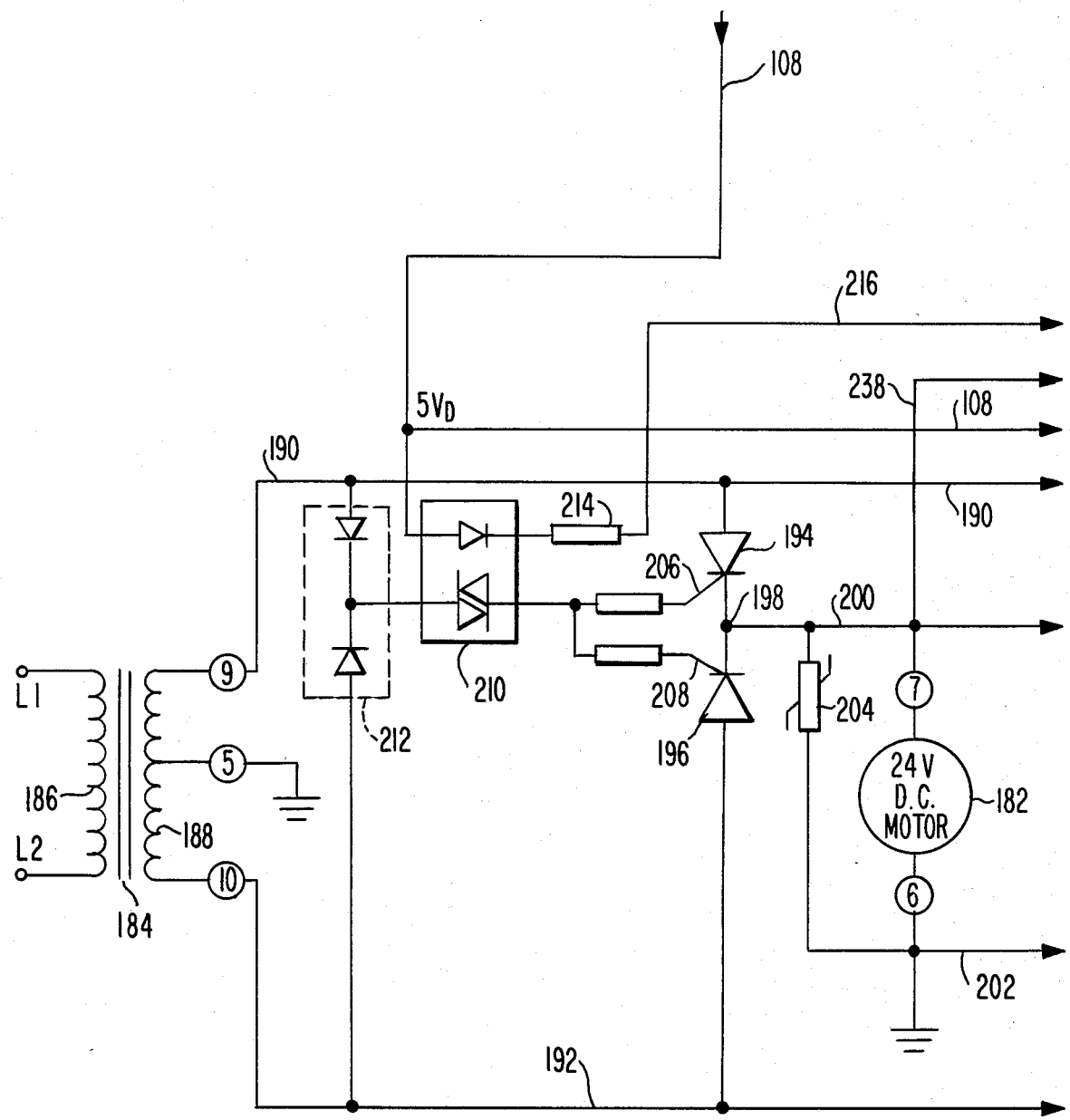

As illustrated in the second embodiment of the power supply control circuit 84 shown in FIGS. 5A-5F, the switches 14, 76 and 78 are connected through different corresponding resistances to produce across terminals 2 and 17 (FIG. 5B) different control voltage levels which correspond to the selected function. The control voltage at terminal 17 is supplied by way of line 86 and amplifier 88 to an input pin 22 on a power supply control microprocessor 90 (FIGS. 5A and 5B). The microprocessor senses a first control voltage level from the on/off switch 14 to activate the control circuit 84, and senses second and third control voltage levels to increase or decrease the welding voltage (or power) and the motor speed of the electrode drive motor.

The power/speed increase switch 76 may, for example, provide a voltage which activates a ramp generator or an up/down counter (not shown) in the microprocessor to count up for the time period that the switch 76 is activated. When the switch is released, the count in the up/down counter (or the voltage output of the ramp generator) selects a predetermined output welding voltage and a corresponding drive motor speed from a power/speed relationship table, which may be in the form of tabular data, a chart, a power vs. speed curve, or the like stored in the microprocessor. One or more such tables may be provided, with a particular table being selected, as will be explained below, to meet the conditions of a particular weld. In similar manner, switch 78 may cause the up/down counter to count down for the time it is activated, to thereby select a new, lower output welding voltage and a new corresponding drive motor speed from the table of values.

The relationship between drive motor speed and welding voltage is predetermined by the tables or curves stored in the microprocessor, but may be modified by means of a potentiometer 92 connected by way of terminal 18, line 94, resistor 96 and line 98 to a pin 21 of the microprocessor 90. The voltage supplied by the potentiometer shifts the power/speed relationships in one direction or the other, as desired, to obtain optimum welding characteristics. The potentiometer 92 may be mounted on the control circuit housing control panel (not shown) for easy access.

Power for the control switches and potentiometer 92 is provided at terminals 1 and 2 by way of line 100 from an analog circuitry bias power supply voltage regulator 102 in a low voltage DC power supply unit 104. A digital circuitry bias power supply voltage regulator 106 provides another low voltage DC on line 108. Input power to voltage regulators 102 and 106 is provided from an input transformer 110 by way of full wave rectifier 112, isolating diode 114 and filter capacitor 116. An unregulated voltage is also supplied via line 118 to an expansion module 120 (FIG. 5B) for use as may be required. The power supply 104 includes a ground line 122. As indicated at block 124 in FIG. 5B, various analog circuit components are connected across lines 100 and 122 to provide operating bias, but since such connections are conventional, they are not shown in detail.

The output of rectifier 112 (FIG. 5A) is connected through a pulse shaping network 126, which includes an operational amplifier 128 to produce on line 130 a train of interrupt pulses. These pulses are at a frequency oof 120 pps, and are supplied to pin 3 of the microprocessor 90 to provide a clock input.

Additional inputs are supplied to the microprocessor 90 by a material selector switch 132 and a mode selector switch 134, both shown in FIG. 5A, and both located on the control panel (not shown) of the welding unit. The material selector switch permits selection of a particular welding power/electrode drive motor speed relationship, which may be in tabular form in the microprocessor, with a different table of relationships for each material. The output arm 136 of the selector switch 132 is connected through line 138 to pin 14 of the microprocessor and through resistor 139 to bias supply line 108. Each contact of the switch is connected by way of a corresponding line 140-145 to a corresponding one of pins 9-13 and 15 of the microprocessor and through a corresponding one of resistors 146-150 to bias line 108, whereby a voltage is applied to the microprocessor input corresponding to the selected position of switch 132. The selected input determines which power/speed table is selected in the microprocessor 90 for use in controlling the output welding voltage and the electrode drive motor speed.

In similar manner, the mode switch 134 includes a movable switch arm 154 connected through output line 156 to pin 10 of the microprocessor 90 and through resistor 158 to power supply line 108. The contacts of switch 134 are connected through lines 160-162 to pins 12, 9 and 11, respectively, of the microprocessor 90, and through resistors 148, 146 and 147, respectively, to line 108. The inputs provided by switch 134 select the mode of operation of the welder, for a continuous weld, a spot weld, or a stitch weld, for example.

Connected by way of terminal 15 to the pin 13 of microprocessor 90 and by way of terminal 14 through resistor 158 to supply line 108 is a thermal switch 164 which is sensitive to the temperature of the power supply control unit 84. When that switch closes, for example upon detection of a temperature in excess of 175 degrees C., the microprocessor 90 responds to the voltage on terminal 13 as though the switch 132 were producing an "off" voltage, and shuts down the welder, while illuminating a red alarm lamp 166 (FIG. 5B), which is connected to pin 32 of the microprocessor.

When the welder is switched on by moving switch arm 136 in selector switch 132 away from the "off" position, the microprocessor 90 produces a ground at pin 31 which illuminates "on" lamp 168 by way of line 170, an optical isolator 172 and power supply line 108. The optical isolator is thereby activated to produce a output on line 174 which is applied to the gate electrode 176 of a triac 178 connected in series with a cooling fan 180 across power lines $L_1$ and $L_2$. This output on line 174 turns the triac on, and activates the fan while the welder unit is on.

A DC drive motor 182 (FIG. 5D) is connected across terminals 6 and 7 of the control circuit 84, and serves to feed the consumable electrode to the welding gun 70. Power is supplied to the motor 182 from input transformer 184 having a primary winding 186 connected across power lines $L_1$ and $L_2$. The secondary winding 188 has a grounded center tap, while its upper and lower ends are connected by way of terminals 9 and 10 and lines 190 and 192 across a pair of opposed power SCR devices 194 and 196. The junction 198 of the SCR devices is connected vai line 200 through terminal 7 to one side of the motor 182, with the other side of the motor being connected to ground line 202. A surge supressor 204 is connected across motor 182.

The gate electrodes 206 and 208 of SCRs 194 and 196, respectively, are connected through suitable resistors and through the output of an optical isolator 210 to a rectifier 212 connected across secondary winding 188. The control input for the isolator 210 is connected to bias supply line 108 and by way of resistor 214 and line 216 to pin 25 of the microprocesor 90, which controls the switching on and off of the isolator 210 in accordance with the selected speed for motor 182. When isolator 210 is on, power is supplied through SCRs 194 and 196 to drive motor 182 at a speed proportional to the time the motor is energized in each cycle of the AC power on lines $L_1$ and $L_2$.

Figure 5E:
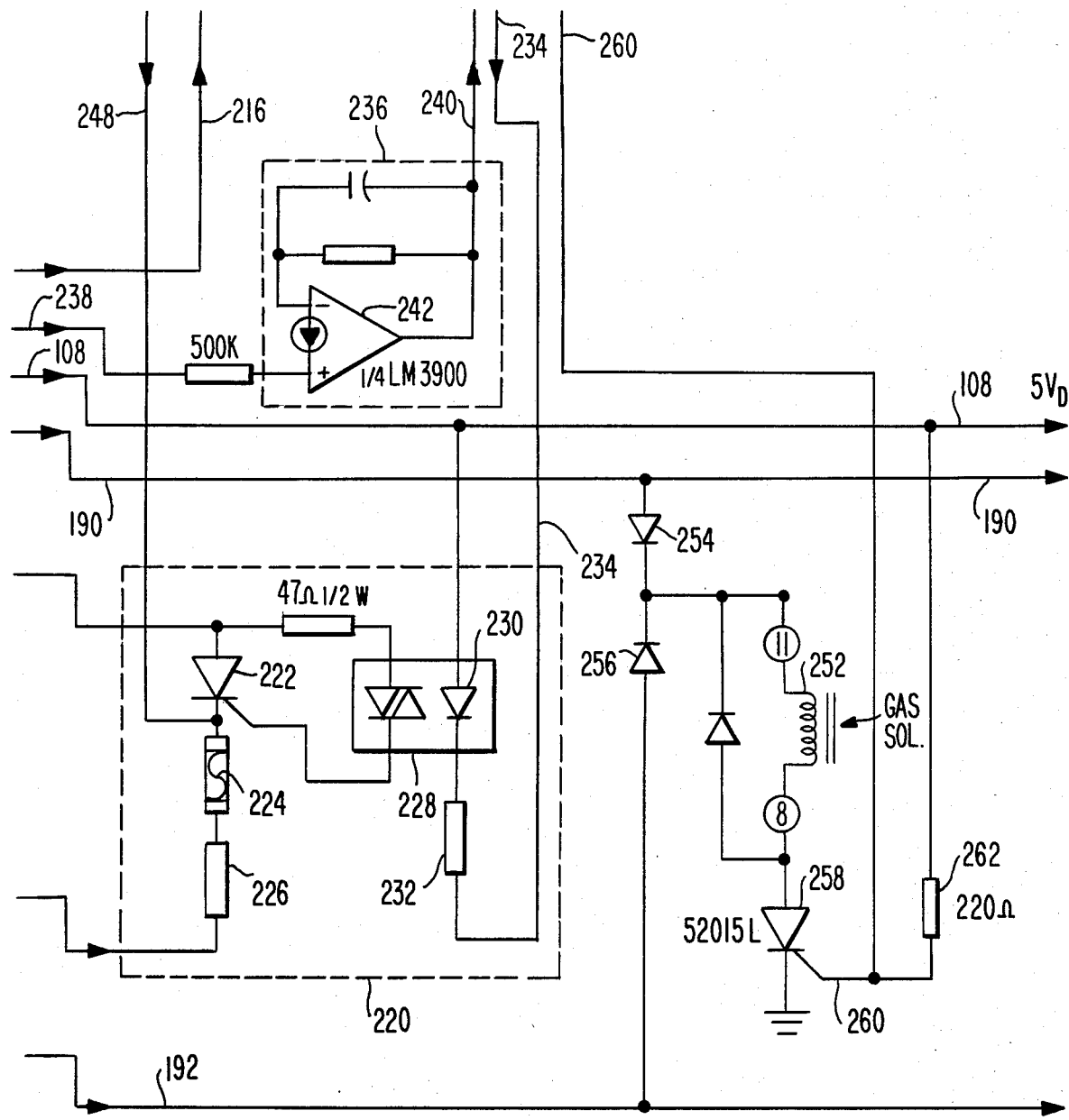

To prevent over-feeding of the consumable electrode, the motor 182 is provided with dynamic braking by means of brake network 220 (FIG. 5E). This network includes a dynamic braking SCR 222 connected across terminals 6 and 7 of the motor 182, via lines 200 and 202. The SCR 222 is connected in series through a fuse 224 and a current limiting resistor 226.

Conduction of the SCR 222 is controlled by an optical isolator 228 having its control diode 230 connected between power supply line 108 and microprocessor pin 26 by way of resistor 232 and line 234, allowing the microprocessor to control dynamic braking of the motor.

A motor sensing circuit 236 (FIG. 5E) is connected by way of line 238 to terminal 7 of motor 182 to sense when a drive voltage is being applied to the motor, and to provide a corresponding brake prevent signal on line 240 which inhibits operation of the dynamic brake 220. Line 240 is connected to pin 24 of microprocessor 90 so that a signal on line 240 prevents the microprocessor from producing an enabling signal on line 234.

To prevent the motor from being activated when the dynamic braking SCR 222 is conductive, a brake sensing circuit 242 (FIG. 5A) comprising an emitter follower transistor 244, is provided. The base of transistor 244 is connected via resistor 246 and line 248 to the cathode of SCR 222 (FIG. 5E), the emitter of the transistor is connected to analog ground line 122 and to pin 20 of the microprocessor, and the collector of transistor 244 is connected via line 250 to pin 17 of microprocessor 90. When dynamic braking is occurring, transistor 244 prevents the microprocessor from enabling the drive motor 182.

In a welding system, it is conventional to provide an inert gas around the region of the arc. The present invention provides automatic supplying of such gas by means of a solenoid-driven gas valve (not shown). The solenoid for such a valve is shown at 252 (FIG. 5E), and is supplied with power from diodes 254 and 256 connected across lines 190 and 192, the junction of the diodes being connected to one side of the solenoid by way of terminal 11. The other side of the solenoid 252 is connected at terminal 8 through an SCR 258 to ground, the gate of the SCR being connected via line 260 to pin 30 of the microprocessor and by resistor 262 to bias supply line 108. The microprocessor enables the solenoid by switching SCR 258 to its conductive state whenever gas is to be supplied to the area of the weld.

Welding power provided at output terminals 270 and 272 is derived from power supply lines 190 and 192 by way of power SCRs 274 and 276, connected back-to-back at junction 278. Junction 278 is connected through line 280 to terminal 270, which in this embodiment is shown as having a negative polarity. Junction 278 is also connected through line 280 and RC filter 282 to ground, and through the RC filter and a controllable choke 284 to positive terminal 272. The SCRs are switched on at selected portions of the AC power supply cycle to regulate the power delivered to the welding terminals 270 and 272.

Control of the SCRs 274 and 276 is effected by means of an optical isolator 286, the output of which is connected through diodes 288 and 290 to the gates of the respective SCRs. The input to isolator 286 is connected to pin 27 of the microprocessor 90 by way of line 292 and resistor 294, and to bias power supply line 108, so that when the microprocessor switches pin 27 to ground, current flows through the isolator 286 and enables the SCRs 274 and 276.

A welding frequency signal from the welding terminal 270 is provided by a feedback circuit 296, connected between terminal 16 at welding output line 280, and pin 23 of the microprocessor 90 by way of line 298. The feedback circuit 296 includes an operational amplifier 300 and an RC filter 302, and senses the output frequency and voltage at terminal 270 to provide a feedback signal to the microprocessor.

During welding, as the electrode melts it alternately breaks and reestablishes contact with the weld puddle, producing an AC component in the welding current which represents a frequency of welding. Control of this frequency of welding is important in obtaining a consistent weld. The microprocessor 90 responds to the measured frequency of welding provided by feedback circuit 296 automatically to adjust the DC power supplied to the welding terminals (and the speed of electrode feed) to keep the welding frequency constant and thereby control the quality of the weld.

The feedback circuit 296 also provides a feedback signal corresponding to the voltage level at the welding terminals, and this feedback signal is also used to vary the slope of the arc voltage vs. arc current curve in order to maintain the desired voltage and power output at the welding terminals. This is done by regulating the conductivity of the SCRs 274 and 276, and also by controlling an inductive choke 284 connected to one of the welding terminals.

The controllable choke 284 may include a saturable reactor 304 having a main winding 306 in series with the welding output terminal 272, and a control winding 308. The inductance of choke 284 is controlled by a control signal supplied from AC power lines $L_1$ and $L_2$ through a control transformer 310, a full wave rectifier 312, and lines 314 and 316 connected to control winding 308. Current to control transformer 310 is, in turn, controlled by a triac 320 connected in series with the primary of transformer 310 by way of terminals 19 and 20. The conductivity of the triac 320 is regulated by an optical isolator 322 having its output connected to the gate 324 of the triac by way of line 326. The input to the isolator 322 is controlled by an emitter follower transistor 328 having its emitter connected by way of line 330 to the isolator 322. The base of the transistor is connected by way of line 332 to pin 33 on the microprocessor, whereby the microprocessor controls the variable choke 284. This control may be effected by way of a manually operated potentiometer on the control panel (not shown) or automatically in response to the feedback signal from feedback circuit 296.

In addition to the selectable power/speed relationship tables incorporated in the control circuit of the present system, it may also be desirable to provide start-up and finish tables which are automatically selected at the start of a weld and at the finish thereof, respectively, since the power vs. speed requirements for the weld may be different at these times. Such relationships may be brought into play, for example, for a predetermined time after the arc is first struck at the start of a weld, and, for example, upon release of the power on/off switch at the end of a weld before the electrode is pulled away from the weld puddle. These tables, as well as the power/speed tables used during a welding operation, are stored in the microprocessor memory and are selected therefrom as required.

Figure 5F:
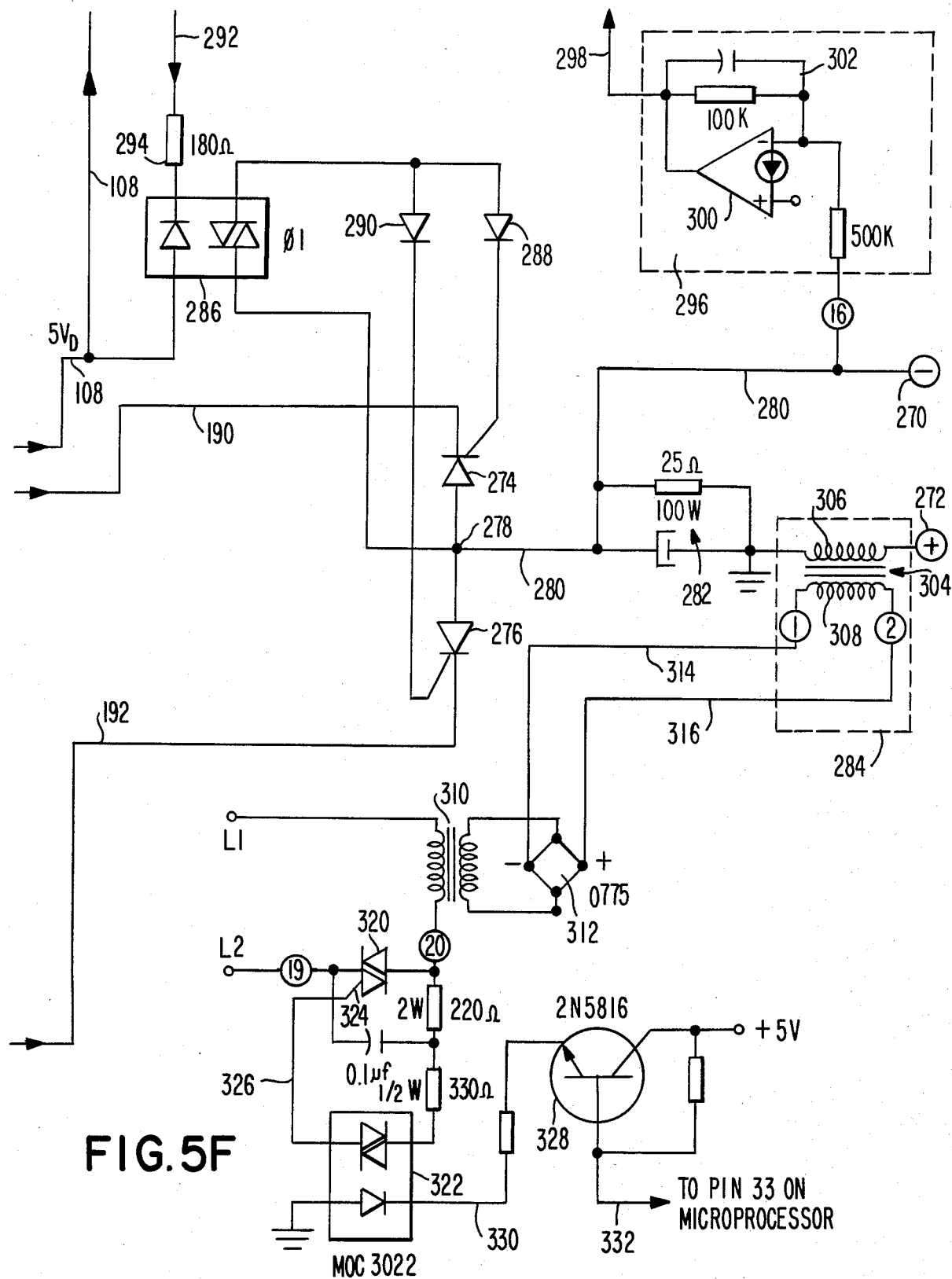

As indicated in FIG. 5F, the output at welding terminals 270 and 272 is controlled by SCRs 274 and 276 by means of optical isolator 286, by feedback circuit 296, and by the control circuit for variable choke 284. This circuitry is shown for a single phase system, but it will be understood that additional weld terminals could be provided in a three phase system, and controlled through optical isolators 286' and 286'', as shown in FIG. 5C. Thus, isolator 286' would be connected through terminals 22 and 23 to the gates of SCRs controlling a second set of output terminals (not shown) and isolator 286'' would be connected through terminals 24 and 25 to a third set of SCRs and output terminals (not shown).

Although the invention has been set forth in terms of preferred embodiments, it will be understood that numerous modifications and variations may be made without departing from the true spirit and scope therof, as set forth in the following claims.

What is claimed is:

1. A welding control system for use in an arc welding assembly comprising:
   a weld gun;
   a welding electrode in said weld gun;
   a welding control unit including a variable power supply for supplying power to said welding electrode and including variable drive means for advancing said electrode at selectable speeds through said weld gun;
   control means mounted on said weld gun for selectively producing a first and a second control signal;

means for transmitting said first and second control signals from said control means on said weld gun to said welding control unit; and means in said welding control unit responsive to said first and second control signals for simultaneously adjusting the power supplied to said welding electrode and correspondingly adjusting the speed at which said variable drive means advances said electrode, said first control signal adjusting said power in a first direction, and said second control signal adjusting said power in a second direction.

2. The control system of claim 1, wherein said control means comprises up/down switch means for selectively producing said first and second control signals to selectively increase or decrease the power supplied to said electrode, and wherein said welding control unit includes control circuit means responsive to said first and second control signals from said up/down switch means for adjusting the power supplied to said welding electrode and for simultaneously adjusting the speed at which said variable drive means advances said electrode.

3. The control system of claim 2, wherein said control unit includes means establishing a predetermined power/speed relationship between the power supplied to said welding electrode and the speed at which said variable drive means advances said electrode, said control circuit means responding to said first and second control signals to select the power supplied to said electrode and the corresponding speed of electrode advancement in accordance with the said predetermined power/speed relationship.

4. The control system of claim 3, said control unit further including means establishing a plurality of selectable predetermined power/speed relationships, and selector switch means for selecting one of said plurality of predetermined power/speed relationships.

5. The control system of claim 4, further including manually adjustable means for varying the selected power/speed relationship.

6. The control system of claim 4, wherein said selector switch means for selecting a power/speed relationship comprises material switch means for selecting a specified power/speed relationship for each of a plurality of different welding electrode materials, said system further including adjustable means for varying the selected predetermined power/speed relationship.

7. The control system of claim 3, wherein said control circuit means includes microprocessor means responsive to said up/down switch means for selecting from said predetemined power/speed relationship a specific welding power and electrode speed.

8. The control system of claim 1, wherein said welding control unit includes means for automatically and continuously adjusting said speed and power in a first direction in accordance with the duration of said first control signal, and for automatically and continuously adjusting said speed and power in a second direction in accordance with the duration of said second control signal.

9. A welding control system for use in an arc welding assembly, comprising:

a controllable welding power supply for supplying power to a welding electrode and to a variable drive means for advancing the welding electrode;
control means producing a control signal;
control circuit means including a mircoprocessor responsive to said control signal for continuously and selectively increasing or decreasing the power supplied to the welding electrode and for simultaneously and continuously adjusting the speed at which said variable drive means advances the electrode in accordance with a predetermined power/speed relationship; and
means for selecting one of a plurality of power/speed relationships whereby the power supplied to said electrode and the advancement speed of said electrode are adjustable by said control signal.

10. The control system of claim 9, further including means for varying the selected power/speed relationship.

11. The control system of claim 10, wherein said control circuit includes a first gate controllable rectifier device connected between a source of AC power and a DC welding terminal, said microprocessor means being responsive to said control signal to operate said first controllable rectifier device to produce a selected power level at said welding terminal for supplying power to a welding electrode.

12. The control system of claim 11, wherein said control circuit further includes a second gate controllable rectifier device connected between a source of power and said variable drive means to provide drive power to said variable drive means, said microprocessor means being further responsive to said control signal to operate said second controllable rectifier device to control said variable drive means to advance the welding electrode at a selected speed corresponding to the power level at said welding terminal as determined by said selected power/speed relationship.

13. The voltage control system of claim 12, further including feedback means connected to said welding terminal and responsive to the welding frequency superimposed on said welding terminal during welding to adjust the power supplied to said terminal.

14. The control system of claim 13, further including means responsive to said feedback means for regulating the DC voltage level of the DC power at said welding terminal.

15. The voltage control system of claim 12, further including choke means connected between said source of AC power and a welding terminal, said control circuit means further including means for controlling the inductance of said choke means.

16. The control system of claim 12, further including dynamic brake means for said variable drive means, said control circuit including means for activating said dynamic brake means only when no drive power is being supplied to said variable drive means.

17. The control system of claim 12, further including temperature sensing means, said control circuit being responsive to said temperature sensing means to produce an alarm signal.

18. The control system of claim 12, further including gas solenoid means, said control circuit means being responsive to said control signal to activate said gas solenoid means.

19. The control system of claim 12, said control circuit further including a predetermined power/speed relationship for start up of a weld.

20. The control system of claim 19, said control circuit further including a predetermined power/speed relationship for the finish of a weld.

* * * * *